C. X. WRIGHT.
LUBRICANT ARRESTER.
APPLICATION FILED SEPT. 6, 1916.

1,220,712.

Patented Mar. 27, 1917.

INVENTOR:
CHARLES X WRIGHT

BY Hazard Berry Miller
ATTORNEYS.

UNITED STATES PATENT OFFICE.

CHARLES X. WRIGHT, OF MIAMI, ARIZONA.

LUBRICANT-ARRESTER.

1,220,712.

Specification of Letters Patent. Patented Mar. 27, 1917.

Application filed September 6, 1916. Serial No. 118,647.

*To all whom it may concern:*

Be it known that I, CHARLES X. WRIGHT, a citizen of the United States, residing at Miami, in the county of Gila and State of Arizona, have invented new and useful Improvements in Lubricant-Arresters, of which the following is a specification.

This invention relates to a lubricant arrester and particularly pertains to a device adapted to be used in connection with revolving shafts to remove excess grease and oil from the surface thereof.

It is the object of this invention to provide a lubricant arrester which may be readily applied to the bearings of revolving shafts and which will act to collect and carry away the excess lubrication with which the shafts have been supplied.

Another object is to provide a lubricator arrester which may be readily applied for use with shafts of various diameters and which will perform its intended function without special adaptation to the particular shaft with which it is to be used.

Another object is to provide a wiper for said device which will insure that the lubricant is carried away from the shaft and which is so positioned as to collect the greater part of the deposit on the shaft.

Another object is to provide means whereby the wiper may be readily removed and replaced and whereby the collected lubricant may be drawn off from the device when desired.

It is a further object to provide a device of the above class which is decidedly simple in its construction and which may be manufactured and applied for use without great expense.

Other objects will appear hereinafter.

The invention is illustrated, by way of example, in the accompanying drawings in which.

Figure 1:
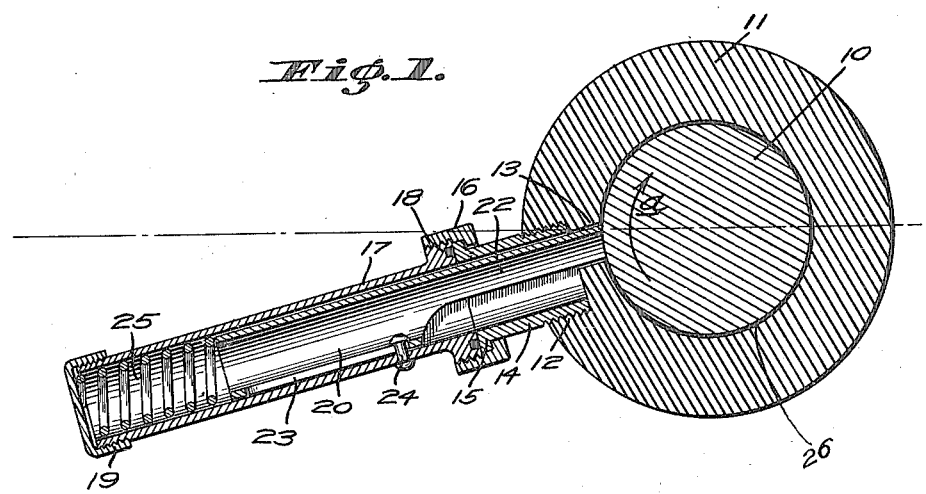
Figure 1 is a view in vertical section as seen taken transversely of a bearing and shaft and particularly shows the grease arrester mounted in connection therewith.
Figure 2:
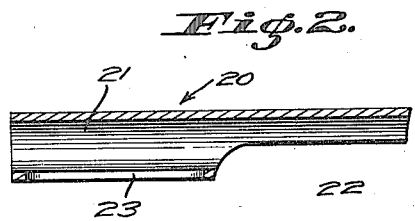
Fig. 2 is a view in vertical section through the shaft wiper.
Figure 3:
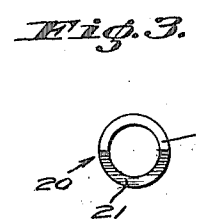
Fig. 3 is a view in end elevation of the shaft contact end of the wiper.
Figure 4:
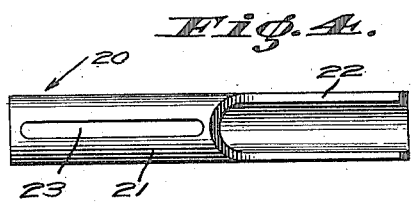
Fig. 4 is a view in elevation of the shaft wiper as seen from beneath it as it is positioned within its housing.

Referring to the drawings more particularly, 10 indicates a shaft which is cylindrical and which is here shown as mounted within a suitable bearing 11. The wall of the bearing 11 is formed with an internally threaded counter-bore 12 which communicates with a semi-circular opening 13 extending from the counter-bore through the remainder of the bearing wall to the shaft. The counter-bore and opening are disposed radially in relation to the shaft and are positioned slightly below the transverse horizontal axis of the shaft and bearing.

The threaded bore 12 is adapted to receive a cylindrical tube 14 which is likewise threaded and which is formed with an enlarged collar 15 around its outer end. This collar is adapted to be encompassed and engaged by a pipe-union 16 which engages the back of the collar and extends outwardly to engage the threaded end of a housing tube 17 which is formed with a gasket 18 adapted to prevent leakage between the outer end of the tube 14 and the adjacent end of the housing 17. The housing tube is opened at its outer end and is threaded exteriorly to receive a cap 19 by which it is closed.

The housing tube 17 and the tube 14, when connected by the union 16, form a continuous cylindrical bore throughout their combined lengths. This bore is adapted to receive a shaft wiper 20 which is here shown as being formed with a cylindrical body portion 21 and a semi-cylindrical end portion 22, the end of which is arcuately formed to approximately conform to the face of the shaft against which it is to bear. A slot 23 extends approximately the length of the lower wall of the cylindrical portion 21 and registers with a guide-pin 24 which is screwed through the lower wall of the housing 17. This guide pin acts to maintain the semi-circular end part of the wiper in proper relation to the opening 13 through which it extends to the shaft. The rear end of the wiper is pressed against by a coil compression spring 25 which bears at its other end upon the inclosing cap 19.

When the shaft 10 is rotated in the direction indicated by arrow —a— in Fig. 1 and is supplied with lubrication, as indicated by the heavy line 26 between the shaft and the bearing, the lubricant will be drawn in the direction of the arrow and will encounter the lower edge of the end portion 22 of the wiper. As the wiper is inclined downwardly, the film of oil will be directed down the inner wall of the wiper and will, due to its adhesion, travel to the lower end of the housing tube 17. When an excess of oil has been collected within the device, the cap 19 may be removed to allow the oil to drain out and may be thereafter replaced.

It will thus be seen that the arrester here described is simple both in its construction and operation and will act positively at all times to collect the surplus oil from the film which occurs between the shaft and the bearing and will conveniently store it without leakage.

I claim:

1. In a lubricant arrester, the combination with a rotatable shaft, of a tubular housing downwardly inclined therefrom, a curved wiper reciprocably mounted therein, said wiper having a channel to conduct the lubricant wiped from said shaft into said housing, means for guiding said wiper in its reciprocating movement, resilient means tending to move said wiper in contact with said shaft, and a removable bottom cap for said housing.

2. In a lubricant arrester, the combination with a rotatable shaft, a bearing therefor, a tubular housing detachably secured to said bearing and downwardly inclined therefrom, a wiper reciprocably mounted in said housing, and having means for conducting the lubricant wiped from said shaft in the said housing, and resilient means tending to move said wiper in contact with said shaft.

3. In a lubricant arrester, the combination with a rotatable shaft, a bearing therefor, a housing detachably secured to said bearing downwrdly inclined thereform, a wiper reciprocably mounted in said housing, means for guiding said wiper in its reciprocal movement, and resilient means tending to move said wiper in contact with said shaft.

4. A lubricant arrester, comprising a cylindrical housing, a wiper reciprocably disposed therein formed with a cylindrical body portion and a semi-cylindrical wiping end adapted to bear against a rotatable shaft, means for maintaining the wiper in a single alined position in relation to the shaft, and spring means for holding the semi-circular end of the wiper against the surface of the shaft.

5. In a lubricant arrester, the combination with a rotatable shaft having a bearing therearound, of a tubular housing detachably secured to the bearing and inclined at an angle below the horizontal, a wiper adapted to reciprocate within said housing formed with a cylindrical body portion and a semi-cylindrical extension therefrom adapted to pass through the bearing and abut against the surface of said rotatable shaft, means for maintaining said wiper in an alined position, a spring adapted to hold the end of the wiper against the shaft, and means whereby the housing may be opened to remove the lubricant collected by said wiper.

In testimony whereof I have signed my name to this specification.

CHARLES X. WRIGHT.

Copies of this patent may be obtained for five cents each, by addressing the "Commissioner of Patents, Washington, D. C."